(12) United States Patent
Tadayon (10) Patent No.: US 11,815,404 B2
(45) Date of Patent: Nov. 14, 2023

(54) HIGH ACCURACY FREQUENCY MEASUREMENT OF A PHOTONIC DEVICE USING A LIGHT OUTPUT SCANNING SYSTEM AND A REFERENCE WAVELENGTH CELL

(71) Applicant: Fluke Corporation, Everett, WA (US)

(72) Inventor: Mohammad Amin Tadayon, Gaithersburg, MD (US)

(73) Assignee: Fluke Corporation, Everett, WA (US)

( * ) Notice: Subject to any disclaimer, the term of this patent is extended or adjusted under 35 U.S.C. 154(b) by 296 days.

(21) Appl. No.: 17/199,212

(22) Filed: Mar. 11, 2021

(65) Prior Publication Data

US 2022/0291056 A1    Sep. 15, 2022

(51) Int. Cl.
| | |
|---|---|
| *G01K 11/26* | (2006.01) |
| *G02B 6/42* | (2006.01) |
| *G01K 11/32* | (2021.01) |
| *G01D 5/353* | (2006.01) |

(52) U.S. Cl.
CPC ............. *G01K 11/26* (2013.01); *G01K 11/32* (2013.01); *G02B 6/4215* (2013.01); *G01D 5/35303* (2013.01)

(58) Field of Classification Search
CPC ...... G01K 11/26; G01K 11/32; G02B 6/4215; G01D 5/35303
See application file for complete search history.

(56) References Cited

U.S. PATENT DOCUMENTS

| | | | | | |
|---|---|---|---|---|---|
| 6,721,053 | B1 * | 4/2004 | Maseeh | ............... | G01N 21/7746 385/12 |
| 7,688,872 | B2 * | 3/2010 | Chen | ..................... | H01S 5/0687 372/29.01 |
| 7,840,101 | B2 * | 11/2010 | Wong | .................. | G02B 6/29338 385/12 |
| 10,050,704 | B1 * | 8/2018 | Yap | ........................ | H01S 5/0687 |
| 10,527,784 | B1 * | 1/2020 | Koste | ...................... | G02B 6/124 |

(Continued)

OTHER PUBLICATIONS

U.S. Appl. No. 63/034,056, filed Jun. 3, 2020.
U.S. Appl. No. 63/034,063, filed Jun. 3, 2020.
International Search Report and Written Opinion for Application No. PCT/US2022/019978 dated Jun. 30, 2022, 14 pages.

(Continued)

*Primary Examiner* — Nathaniel T Woodward
*Assistant Examiner* — Philip L Cotey
(74) *Attorney, Agent, or Firm* — SEED INTELLECTUAL PROPERTY LAW GROUP LLP (57) ABSTRACT

A system for determining a signature frequency of a photonic device includes a reference cell that receives a first light beam of a plurality of light beams. Based on a predetermined characteristic of the reference cell, the reference cell produces a first identifiable output indicative of a reference frequency in response to light in the first light beam having a particular frequency. A photonic device receives a second light beam of the plurality of light beams, and produces a second identifiable output in response to light in the second light beam having a frequency at the signature frequency. A computing device uses electrical signals representative of the first and second identifiable outputs to determine the signature frequency of the photonic device. A light source may emit a light beam having a controlled change of frequency and an optical splitter splits the light beam to produce the plurality of light beams.

20 Claims, 4 Drawing Sheets

(56) References Cited

U.S. PATENT DOCUMENTS

| | | | | |
|---|---|---|---|---|
| 2008/0296480 A1* | 12/2008 | Haber | ............... | G01M 11/3127 250/227.14 |
| 2009/0238557 A1* | 9/2009 | Chen | ............... | H01S 5/0687 398/16 |
| 2012/0298849 A1* | 11/2012 | He | ............... | H01P 11/00 250/227.14 |
| 2013/0135620 A1* | 5/2013 | De Groot | ............... | G01L 1/103 356/445 |
| 2014/0321502 A1* | 10/2014 | Ahmed | ............... | G01K 11/00 374/130 |
| 2015/0116724 A1* | 4/2015 | Nieuwland | ............... | H01S 5/14 356/450 |
| 2015/0308911 A1* | 10/2015 | Pechstedt | ............... | G01L 19/04 73/579 |
| 2022/0221742 A1* | 7/2022 | Roxworthy | ............... | G02B 6/12007 |

OTHER PUBLICATIONS

Del'Haye, P. et al., "Optical frequency comb generation from a monolithic microresonator", *Nature*, 450(7173), Dec. 2007, 1214-1217.

Xu, H. et al., "Ultra-sensitive chip-based photonic temperature sensor using ring resonator structures", *Optics Express*, 22(3), 2014, 3098-3104.

Klimov, N. N. et al., "On-Chip Silicon Waveguide Bragg Grating Photonic Temperature Sensor", *Optics letters*, 40(17), 2015, 3934-3936.

Klimov, N. et al., "Towards Replacing Resistance Thermometry with Photonic Thermometry", *Sensors and Actuators A: Physical*, 269, 2018, 308-312.

FFP-1 Luna "Fiber Fabry-Perot Interferometer", downloaded Mar. 9, 2021, https://lunainc.com/product/ffp-i and https://lunainc.com/sites/default/files/assets/files/resource-library/FFPI.pdf.

* cited by examiner

HIGH ACCURACY FREQUENCY MEASUREMENT OF A PHOTONIC DEVICE USING A LIGHT OUTPUT SCANNING SYSTEM AND A REFERENCE WAVELENGTH CELL

BACKGROUND

Technical Field

This disclosure pertains to determination of a signature frequency of a photonic device, which may be a resonance of the photonic device, and which in various embodiments may be used, for example, to determine a temperature of the photonic device.

Description of the Related Art

A photonic thermometer, as part of a temperature measurement system, measures characteristics of light, in some cases a resonant frequency of light, in a photonic device to determine a temperature measurement. Such temperature measurement systems are valued for their size, robustness, accuracy, precision, and potential range of applications. However, there are deficiencies associated with current photonic thermometers. Devices that are used in current photonic temperature measurement systems, such as wavelength meters that measure the wavelength of light, are complicated and expensive. In addition, variations in ambient temperature can also affect the operation of these measurement devices, so exposure of these measurement devices to temperature variations over time can introduce uncertainty in the measurements obtained. What is needed, at least in part, is improved technology for determining the signature frequency (e.g., resonant frequency) of a photonic device that is less complex and less expensive as compared to current photonic technology yet is robust and highly accurate, particularly when implemented in a temperature measurement system.

BRIEF SUMMARY

Disclosed herein are systems and methods for determining a signature frequency of a photonic device. In various embodiments, a system of the present disclosure includes a light source that emits a light beam which changes over a range of frequencies. The light source emits the light beam according to a controlled change of frequency. The system also includes an optical splitter that splits the light beam emitted by the light source into a plurality of light beams. A reference cell receives a first light beam of the plurality of light beams and, based on a predetermined characteristic of the reference cell, the reference cell produces a first identifiable output indicative of a reference frequency in response to light in the first light beam having a particular frequency.

Further included in the system is a photonic device that receive a second light beam of the plurality of light beams from the optical splitter. The photonic device produces a second identifiable output in response to light in the second light beam having a frequency at the signature frequency of the photonic device. A computing device receives electrical signals representative of the first and second identifiable outputs of the reference cell and the photonic device, respectively, and uses the received electrical signals to determine the signature frequency of the photonic device.

In some embodiments, the signature frequency of the photonic device is a resonant frequency. In some embodiments, the light source is a tunable laser, and a current ramp is coupled to the tunable laser to control the change of frequency of the light in the light beam emitted by the tunable laser.

In some embodiments, the system includes a first photodetector coupled to receive light output from the reference cell and a second photodetector to receive light output from the photonic device. The first and second photodetectors are configured to produce the electrical signals representative of the first and second identifiable outputs based on the light output from the reference cell and the photonic device, respectively.

In some embodiments, the predetermined characteristic of the reference cell is a known absorption characteristic of reference material in the reference cell. In such embodiments, the reference cell produces the first identifiable output in response to light energy in the first light beam at the particular frequency being absorbed by the reference material.

In some embodiments, the predetermined characteristic of the reference cell is a known optical resonance of the reference cell, and in such embodiments, the reference cell produces the first identifiable output in response to the first light beam at the particular frequency resonating in the reference cell.

In some embodiments, the system includes an optical resonator configured to receive a third light beam of the plurality of light beams from the optical splitter. The optical resonator produces an output having a plurality of reference peaks of intensity that occur as the frequency of the light in the light beam emitted by the light source changes. The reference peaks in the output of the optical resonator occur at frequency intervals as the frequency of the light in the light beam emitted by the light source changes, and the computing device receives an electrical signal representative of the reference peaks in the output of the optical resonator. The computing device uses the electrical signal representative of the reference peaks along with the electrical signals representative of the first and second identifiable outputs to determine the signature frequency of the photonic device.

In some embodiments, the computing device determines the signature frequency of the photonic device by determining a total number of reference peaks that occurred in the output of the optical resonator from when the first identifiable output occurred to when the second identifiable output occurred, determining a total change of frequency of the light in the light beam emitted by the light source based on a known change of frequency between adjacent reference peaks multiplied by the total number of reference peaks, and adding the total change of frequency to the reference frequency indicated by the first identifiable output.

In some embodiments, the computing device determines the signature frequency of the photonic device by monitoring elapsed time or a current change from when the first identifiable output occurred to when the second identifiable output occurred, determining a total change of frequency of the light in the light beam emitted by the light source based on the controlled change of frequency and the elapsed time or current change, and adding the total change of frequency to the reference frequency indicated by the first identifiable output.

In some embodiments, the computing device is configured to determine a temperature of the photonic device based on a correlation between the signature frequency of the photonic device and the temperature of the photonic device. The system may further include a temperature measurement device that determines an estimated temperature of the photonic device. In such embodiments, the computing device uses the estimated temperature to facilitate the determination of temperature of the photonic device based on the correlation between the signature frequency and the temperature of the photonic device. In some embodiments, the temperature measurement device is an interferometer, and an output of the interferometer is used in determining the estimated temperature.

Also disclosed are methods for determining a signature frequency of a photonic device. At least one method of the present disclosure include causing a light source to emit a light beam having a controlled change of frequency; splitting the light beam emitted by the light source into a plurality of light beams; receiving, by a reference cell, a first light beam of the plurality of light beams, and based on a predetermined characteristic of the reference cell, producing a first identifiable output indicative of a reference frequency in response to light in the first light beam having a particular frequency; receiving, by a photonic device, a second light beam of the plurality of light beams, and producing a second identifiable output in response to light in the second light beam having a frequency at the signature frequency of the photonic device; and receiving, by a computing device, electrical signals representative of the first and second identifiable outputs of the reference cell and the photonic device, respectively, and using the received electrical signals to determine the signature frequency of the photonic device.

In some embodiments, the first identifiable output is produced in response to light energy in the first light beam at the particular frequency being absorbed by reference material in the reference cell. In some embodiments, the first identifiable output is produced in response to the first light beam at the particular frequency resonating in the reference cell.

In some embodiments, the method may further include receiving, by an optical resonator, a third light beam of the plurality of light beams, and producing an output having a plurality of reference peaks of intensity as the frequency of the light in the light beam emitted by the light source changes. The reference peaks occur at frequency intervals as the frequency of the light in the light beam emitted by the light source changes. The computing device receives an electrical signal representative of the reference peaks in the output of the optical resonator, and uses the electrical signal representative of the reference peaks along with the electrical signals representative of the first and second identifiable outputs to determine the signature frequency of the photonic device.

In some embodiments, the signature frequency of the photonic device is determined by determining a total number of reference peaks that occurred in the output of the optical resonator from when the first identifiable output occurred to when the second identifiable output occurred, determining a total change of frequency of the light in the light beam emitted by the light source based on a known change of frequency between adjacent reference peaks multiplied by the total number of reference peaks, and adding the total change of frequency to the reference frequency indicated by the first identifiable output.

In some embodiments, the signature frequency of the photonic device is determined by monitoring elapsed time or a current change from when the first identifiable output occurred to when the second identifiable output occurred, determining a total change of frequency of the light in the light beam emitted by the light source based on the controlled change of frequency and the elapsed time or current change, and adding the total change of frequency to the reference frequency indicated by the first identifiable output.

In some embodiments, the method may further include determining a temperature of the photonic device based on a correlation between the signature frequency of the photonic device and the temperature of the photonic device. The method may also include estimating a temperature of the photonic device, and using the estimated temperature to facilitate the determination of temperature of the photonic device based on the correlation between the signature frequency and the temperature of the photonic device.

In the drawings, the size and relative positions of elements are not necessarily drawn to scale. For example, some elements or features may be arbitrarily enlarged and positioned to improve clarity and understanding of the present disclosure.

DETAILED DESCRIPTION

Described herein are improved systems and methods for determining a signature frequency (e.g., resonant frequency) of light traversing a photonic device. The resonant frequency of light in a photonic device (as one example of a signature frequency) is usable to determine, for example, the temperature of the photonic device. As will be appreciated from the following description, embodiments of the present disclosure provide a robust and accurate determination of the frequency (or wavelength) of light from a photonic device with greater simplicity in construction and operation and less cost as compared to current systems that use more expensive wavelength meters to measure the wavelength of light.

Figure 1A:
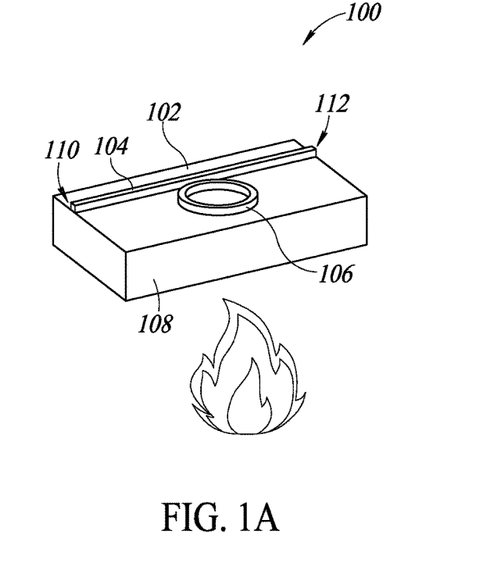
FIG. 1A is a pictorial diagram illustrating a system including a photonic device that is usable for temperature measurement.

FIG. 1A depicts at least one embodiment of a system 100 including a photonic device 102 that may be used, for example, in a photonic thermometer to measure temperature. The photonic device 102 includes a substrate 108 having a waveguide 104 and an optical resonator 106 positioned proximate to the waveguide 104. The waveguide 104 provides a conduit for light to be communicated through the photonic device 102. The waveguide 104 includes a first port 110 for communicating light into the waveguide 104 and a second port 112 for communicating light out of the waveguide 104.

The photonic device 102 is useable to measure temperature based on a detected resonant frequency of light traveling in the optical resonator 106. The resonant frequency of the optical resonator 106 changes according to the temperature of the substrate 108 due to thermo-optic effects, such as refractive index of the material forming the optical resonator 106, that are dependent on the temperature of the photonic device 102.

In the illustrated embodiment, the substrate 108 supports the waveguide 104 and the optical resonator 106 in a fixed relationship. The substrate 108 (and the waveguide 104 and optical resonator 106) may be formed of a material having optically transparent properties such that, by virtue of the proximity of the optical resonator 106 to the waveguide 104, at least a portion of the light traversing the waveguide 104 is directed into the optical resonator 106 via internal reflection in the waveguide 104. For instance, the substrate 108 may be formed of a material that includes silicon, such as silicon dioxide, a silicate (e.g., borosilicate glass, lead glass, aluminum silicate), carbonate (e.g., sodium carbonate), glass-ceramics, amorphous metal, or silica-free glasses, by way of non-limiting examples. The substrate 108 may be formed of other suitable materials based on a desired application or desired properties of the waveguide 104 and optical resonator 106 of the photonic device 102. The photonic device 102, including the substrate 108, the waveguide 104, and the optical resonator 106, may be formed using various fabrication methods, such as lithography methods (e.g., photolithography, e-beam lithography, embossing, direct pattern writing, 3D printing), film deposition, film growth, and film etching, by way of non-limiting example.

In FIG. 1A, the optical resonator 106 of the photonic device is optically coupled to the waveguide 104. In some embodiments, the waveguide 104 is spaced apart from the optical resonator 106. At least a portion of the light that enters the waveguide 104 via the first port 110 is received into the optical resonator 106. A characteristic of the light traveling within the optical resonator 106 is modified as it traverses the resonator and the modified light is coupled back into the waveguide 104. The modified light travels through the remainder of the waveguide 104 along in superposition with original light communicated into the first port 110. The modified light and original light are thereafter emitted from the second port 112 of the waveguide 104.

Figure 1B:
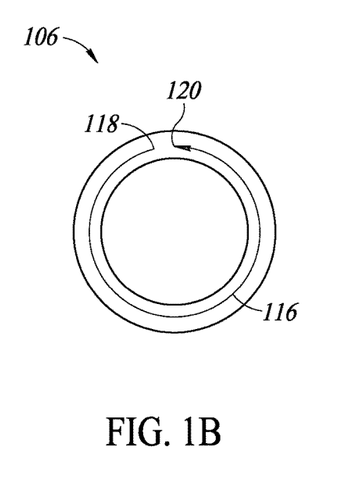
FIG. 1B is a pictorial diagram illustrating a light path of an optical resonator of a photonic device such as shown in FIG. 1A.

FIG. 1B shows a light path 116 of the optical resonator 106. In this example, the optical resonator 106 has an annular or toroidal shape. The light path 116 extends in a circumferential direction through a cross-sectional center of the optical resonator 106. In operation, original light coupled into the optical resonator 106 enters the optical resonator 106 at a first point 118, and is internally reflected between internal surfaces of the optical resonator 106 along the effective light path 116. The direction of travel of the light may be clockwise or counter-clockwise in the resonator 106 depending on the particular implementation. The light exits the optical resonator 106 from a second point 120. A characteristic of the light traveling through the optical resonator 106 is modified relative to original light traveling through the waveguide 104. Those skilled in the art will understand there may be different first points 118 and second points 120 at which different rays of light are respectively coupled into and out of the optical resonator 106. The modified light is coupled back into the waveguide 104 from the second point 120 and exits the waveguide 104 along with original light.

Figure 2A:
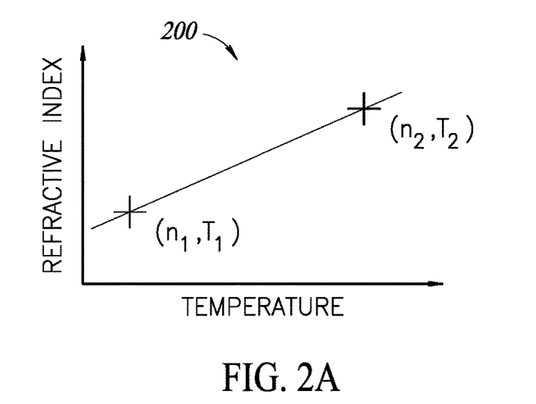
FIG. 2A is a diagram illustrating a relationship between refractive index and temperature of a photonic device such as shown in FIG. 1A.

FIG. 2A shows a diagram 200 depicting a relationship between a refractive index of material forming the substrate 108 and a temperature of the material of the substrate 108. In this example, the diagram 200 depicts a relationship between a refractive index, $n_i$, and temperature, $T_i$, of a substrate 108 formed of silicon. At a temperature $T_1$, the material has a refractive index of $n_1$, and at a different temperature $T_2$, the material has a different refractive index $n_2$. In FIG. 2A, the change in the refractive index n of the substrate 108 is directly proportional to the change in temperature T of the substrate 108. For instance, the refractive index n of the substrate 108 may change linearly relative to the temperature T of the substrate 108, though in other implementations, the relationship of the refractive index and the temperature may be nonlinear. In various embodiments, the substrate 108 may be constructed of different materials having different optical properties, including a different refractive index n, with different response characteristics that change according to changes in temperature of the material.

As a result of change in temperature T experienced by the substrate 108 of the photonic device 102, and the consequent change in the refractive index n, an effective length of the light path 116 in the resonator 106 may change. For example, the effective length of the light path 116 may change according to the following equation:

$$L_{eff}(T) = n_{eff}(T)L$$

where L is the length of the light path 116, $L_{eff}$ is the effective length of the light path 116, T is the temperature of the substrate 108, and $n_{eff}$ is the effective refractive index of the substrate 108 at the temperature T. As can be seen, the effective length $L_{eff}$ of the light path 116 changes due to changes in the temperature T experienced by the photonic device 102. The length $L_{eff}$ may increase with a corresponding increase in temperature, for instance.

Figure 2B:
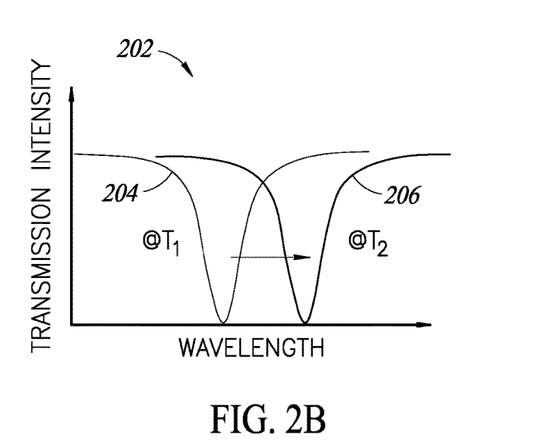
FIG. 2B is a diagram illustrating a change in characteristics of light traversing a photonic device, such as shown in FIG. 1A, as a result of change of temperature of the photonic device.

The change in effective length $L_{eff}$ causes a corresponding change in the light in the optical resonator 106. FIG. 2B shows a diagram 202 depicting a change in characteristics of the light emitted from the second port 112 as a result of a change in temperature of the photonic device 102. For instance, the optical intensity or power of the output light (which is a superposition of the modified light from the optical resonator 106 and original light introduced into the waveguide 104) may have a first profile 204 relative to wavelength of the original light at a first temperature $T_1$, and a second profile 206 relative to wavelength of the original light at a second temperature $T_2$. As shown, the first profile 204 and the second profile 206 depict a shift in resonant frequency of the light in the optical resonator 106 that depends on the temperature of the optical resonator.

The resonant wavelength of the optical resonator 106 in this instance may be calculated using the following equation:

$$\lambda_1 = \frac{n_1 l_1}{m_1}$$

where $l_1$ is the length of the optical resonator, $n_1$ is the refractive index of the optical resonator, and $m_1$ is the mode of the optical resonator.

The slope of the curve indicating the resonant wavelength of the optical resonator 106 may change with respect to temperature. In particular, the slope of the curve indicating the resonant wavelength of the optical resonator 106 relative to the temperature T may be represented by the following equation:

$$\frac{d\lambda_1}{dT} = \frac{l_1}{m_1}\frac{dn_1}{dT}$$

where $$\frac{d\lambda}{dT}$$

is a change in wavelength relative to change in temperature of the optical resonator, $$\frac{dn}{dT}$$

is the change in refractive index relative to change in temperature of the optical resonator, $l_1$ is the length of the optical resonator, and $m_1$ is the mode number of the optical resonator.

Existing thermal measurement systems, or photonic thermometers, may include the photonic device 102 and a wavelength meter coupled to receive light that is output from the photonic device 102. The wavelength meter may analyze the wavelength of the light from the second port 112 of the photonic device 102 and detect a resonant wavelength thereof, to determine the temperature of the photonic device 102 based on a known relationship of resonance and temperature of the photonic device 102. However, presently-known wavelength meters are expensive to procure and maintain. Wavelength meters may also experience significant drift over time, which has an adverse effect on calibration of the system as a whole. Recalibration of the system may be required to ensure accurate measurement over time. Significant training and scientific knowledge are typically necessary for persons using such measurement systems, which increases the cost and complexity associated with operating such systems.

Instead of using a wavelength meter as currently employed, improved measurement systems according to the present disclosure use a wavelength scanning system and a simple wavelength (or frequency) measurement technique that significantly decreases the cost and complexity of the measurement and hence the determination of temperature. The components and operating procedure for wavelength (or frequency) measurement according to the present disclosure allows for simpler detection of the resonant wavelength (or frequency) of a photonic device while retaining high accuracy and precision of measurement. This enables a less expensive determination of the temperature of the photonic device. In many embodiments, the wavelength measurement system of the present disclosure can be constructed using a novel arrangement of commercially-available optical components that are operated in a new and inventive way.

Figure 3:
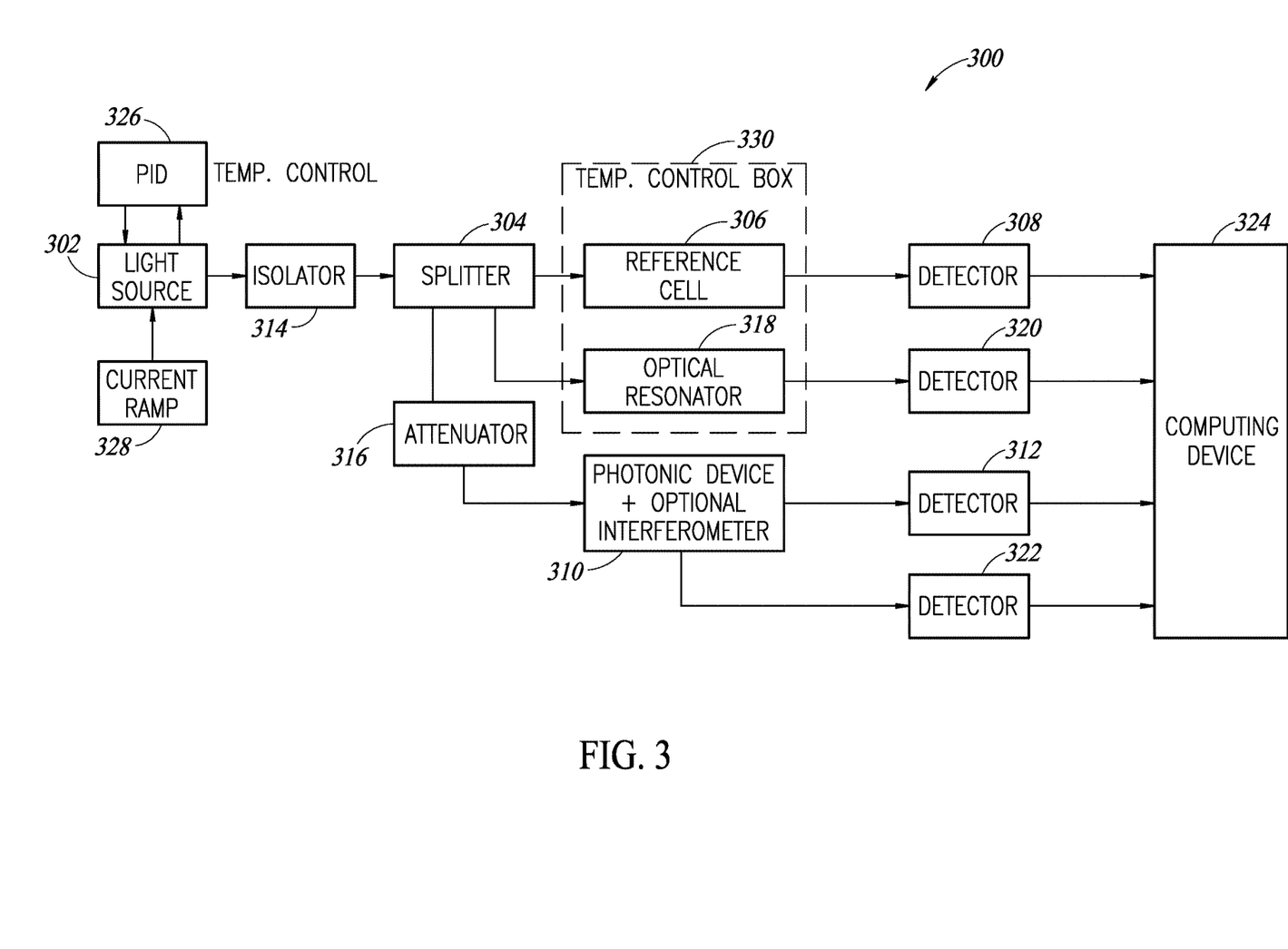
FIG. 3 is a block diagram illustrating one example of a measurement system in accordance with the present disclosure.

FIG. 3 illustrates one example of a measurement system 300 constructed in accordance with principles of the present disclosure. Components of the measurement system 300 include, in this example, a light source 302 such as a tunable laser, an optical splitter 304, a reference cell 306, a first photodetector 308, a photonic device 310, a second photodetector 312, and a computing device 324. Additional optional components of the measurement system 300 include an isolator 314, an attenuator 316, an optical resonator 318, a third photodetector 320, an interferometer or other device usable for temperature measurement (which may be on-chip with the photonic device 310), and a fourth photodetector 322.

In this particular example, the measurement system 300 uses a proportional-integral-derivative (PID) controller 326 and a current ramp 328 to control operation of the light source (e.g., tunable laser) 302 to emit a light beam having a frequency that, over a period of time, changes or scans across a range of frequencies. In this implementation, the PID controller 326 controls the temperature of the light source 302 (i.e., maintains a steady temperature), while the current ramp 328 controls the light output by the light source 302 and causes the emitted light beam to change frequency over a range of frequencies. In operation, under control of the current ramp 328, the light source 302 outputs light at an increasing or decreasing frequency. As will be appreciated from the description below, in typical or preferred implementations, the light source 302 is controlled by the current ramp 328 so as to output light across the range of frequencies at a relatively constant rate of change of frequency over the period of time.

Optionally, in various implementations, the measurement system 300 may include an isolator 314 that receives and isolates the light beam emitted by the light source 302. The optical isolator 314 permits one-way transmission of light from the light source 302 to the optical splitter 304. In operation, the optical isolator 314 prevents unwanted feedback of light into the components of the light source 302. In some embodiments, for example, the optical isolator 314 may be constructed using known components such as a Faraday rotator, and may be polarization dependent or independent.

The output of the optional optical isolator 314 is thereafter directed to the optical splitter 304. The optical splitter 304 is comprised of one or more optical elements that operate to split the light beam from the light source 302 into a plurality of light beams. Optical splitters are well-known in the field of optics. In the illustrated implementation, the optical splitter 304 splits the light beam into a first light beam, a second light beam, and a third light beam, though in other implementations, the optical splitter 304 may split the light beam from the light source 302 into a fewer or greater number of light beams. In other embodiments of the system 300, multiple light sources may be used instead of splitting the light beam from a single light source, provided the wavelength of the light output from the multiple sources is coordinated.

The first light beam from the optical splitter 304 is directed to the reference cell 306. The reference cell 306 is a device or component that produces an identifiable output indicative of a reference frequency in response to light in an input light beam having a particular frequency.

In some embodiments, a suitable reference cell 306 may contain a reference material having known optical energy absorption properties. As the first light beam traverses the reference material in the reference cell 306, light energy in the first light beam is absorbed by the reference material. The amount of light energy absorbed by the reference material changes according to the frequency of the light in the light beam. The optical energy or optical power of the light that has traversed the reference cell 306 and is output from the reference cell 306 (i.e., light energy not absorbed by the reference material) is detected by the photodetector 308 and an electrical signal representative thereof is provided to a computing device 324. As the frequency of the first light beam scans across a range of frequencies (i.e., due to control of the light source 302), the detected intensity or power of the output light from the reference cell 306 exhibits a peak attenuation (absorption) at a frequency that is known based on known properties of the reference material in the reference cell 306. Thus, the computing device 324 is able to determine a reference frequency based on observation of a peak absorption of the light energy in the first light beam as detected by the photodetector 308. When a peak absorption is observed, the computing device 324 is able to accurately determine the frequency of the light in the light beam output by the light source 302 at that moment.

A molecular wavelength reference cell or atomic wavelength reference cell relies on the fact that light absorption characteristics of certain materials (molecules or atoms) are well known. At a physical level, when the first light beam from the splitter 304 passes through the reference material in the reference cell 306, electrons in the atoms and/or molecules of the reference material absorb some of the light energy passing through the reference material. The amount of light energy that is absorbed at a given frequency is unique to the type of atom or molecule of the material. Acetylene, for example, has known specific absorption lines (i.e., frequencies of peak absorption). Similarly, other materials have unique, known absorption lines. The reference cell 306 is thus configured to produces a first identifiable output indicative of a reference frequency in response to light in the first light beam from the optical splitter 304 having a particular frequency, namely the frequency of peak absorption according to the type of reference material in the reference cell.

In other embodiments, a suitable reference cell 306 may be constructed using frequency combs or optical cavities that provide a stable resonant output at one or more known frequencies. Such reference cells do not rely on absorption characteristics of material in the reference cell, but rather operate based on spatial (e.g., dimensional) characteristics of the reference cell that produce a known optical resonance of the reference cell. One example of a frequency comb is a Kerr frequency comb. In such example, the light beam from the optical splitter 304 (e.g., the first light beam) may be coupled into a microresonator (e.g., a microscopic glass disk that has whispering-gallery modes) having a structure with a series of resonant modes at approximately equally spaced frequencies (similar to a Fabry-Pérot interferometer). Depending on the frequency comb or optical cavity used, the reference cell 306 produces a measurable output that is responsive to an input light beam at a known frequency. The reference cell 306 thus produces a first identifiable output indicative of a reference frequency in response to light in the first light beam having a particular frequency that is known to resonate in the reference cell 306.

Figure 4:
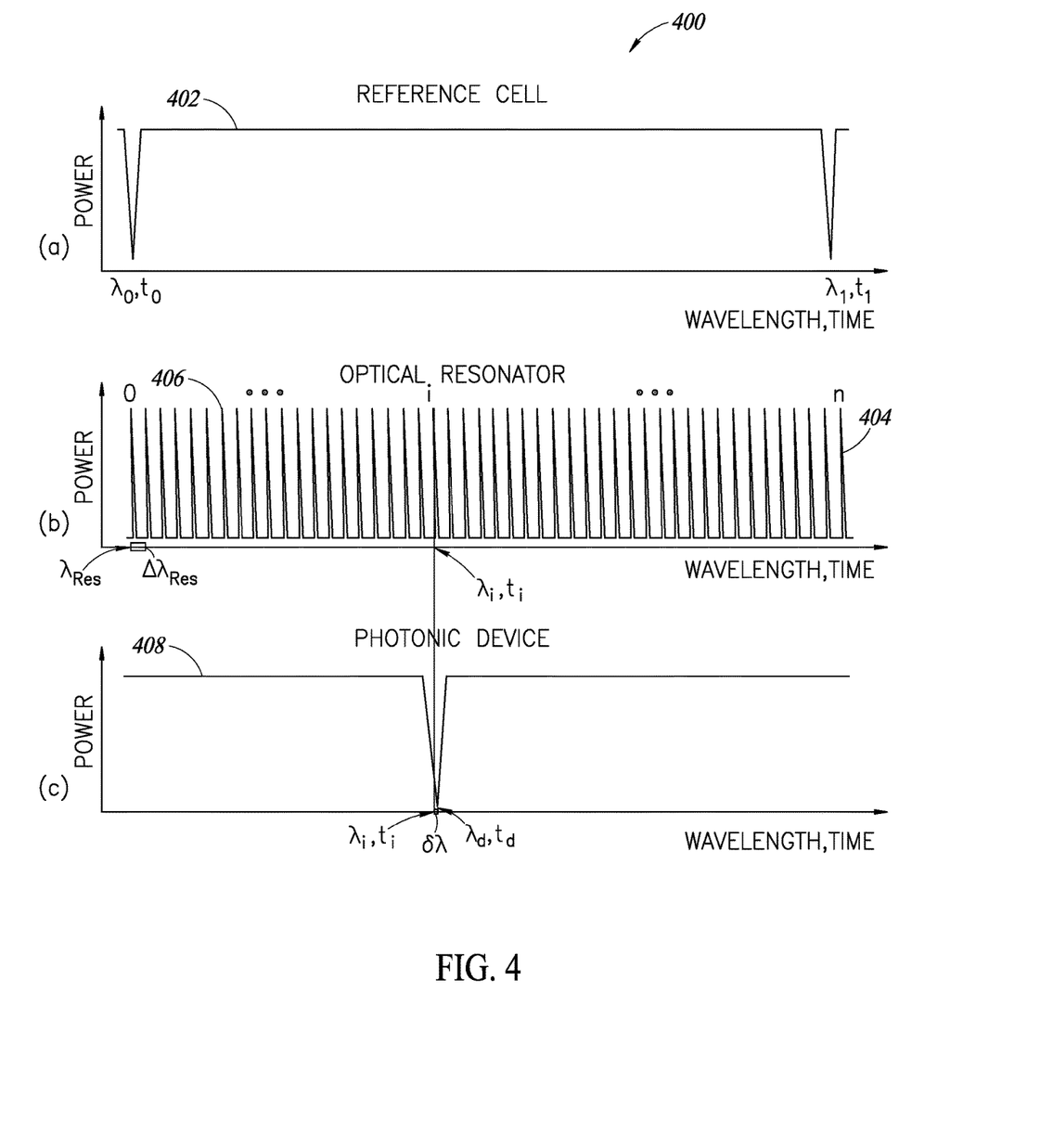
FIG. 4 is a diagram comprised of three graphs illustrating relationships of light output from a reference cell, an optical resonator, and a photonic device in accordance with the present disclosure.

The photodetector 308 outputs an electric signal to the computing device 324 based on the detected intensity or optical power of the light received from the reference cell 306. The computing device 324 may be programmed, for example, to compare the amplitude of the electric signal to a determined reference threshold and identify when the amplitude of the electric signal drops below (or exceeds) the determined reference threshold. For example, as illustrated in FIG. 4(a), the computing device 324 may observe a detected light intensity or power at time to that has dropped below a reference threshold. From this observation, the computing device 324 may determine that, at time to, a peak absorption of the light energy in the first light beam has occurred (for a reference cell comprised of reference material), and given the known absorption spectra of the reference material in the reference cell 306, the computing device 324 is able to determine that, at time to, the light beam produced by the light source 302 had a specific wavelength $\lambda_0$.

Following time $t_0$, as the light source 302 increases (or decreases) the wavelength of its output light over time and provides, via the splitter 304, a portion of the output light to the reference cell 306, the computing device 324 continues to monitor the electric signal output by the photodetector 308. In the example shown, at time $t_1$, the computing device 324 may again observe a detected light intensity or power that has dropped below (or exceeded) a reference threshold. From this observation, the computing device 324 determines that, at time $t_1$, the reference material in the reference cell 306 again significantly absorbed the light energy of the first light beam received from the splitter 304, and using the known absorption characteristics of the reference material in the reference cell 306, the computing device 324 determines that, at time $t_1$, the light beam produced by the light source 302 had a specific wavelength $\lambda_1$.

The particular reference material used in the reference cell 306 may be chosen so as to have one or more absorption lines (wavelengths $\lambda_0$ and $\lambda_1$) at wavelengths that span the anticipated resonant wavelength(s) of the photonic device 310, for example the anticipated resonant wavelength(s) that correspond to a range of temperatures to be detected using the photonic device 310. In embodiments where the reference cell 306 uses a frequency comb or resonant optical cavity, the particular spatial characteristics of the frequency comb or optical cavity may be chosen so that the reference cell has a frequency response within a range of the anticipated resonant wavelength(s) of the photonic device 310.

Another one of the light beams from the optical splitter 304 (i.e., a second light beam in the illustrated embodiment) is directed to the photonic device 310. In some implementations, the second light beam may be communicated through an optical attenuator 316. The optical attenuator 316 attenuates the energy or intensity of the second light beam, which is then directed to the photonic device 310. The optical attenuator 316 may be constructed so as to attenuate the second light beam to an optimal intensity for operation of the photonic device 310. Optimal operation of the photonic device 310 may depend on characteristics of the material and the arrangement of components that are used to construct the photonic device 310.

In some implementations, the photonic device 310 may be constructed similar to the photonic device 102 illustrated in FIG. 1A, though embodiments of the measurement system 300 are not limited to use of such a photonic device. The photonic device 310 can be any type of on-chip or off-chip photonic/optical device that produces a measurable signature frequency or frequency response, including for example a resonance frequency and/or non-resonance frequencies of the photonic/optical device. Other embodiments of the measurement system 300 may use other types of photonic devices, particularly photonic devices that exhibit a resonant frequency or non-resonant frequencies that change according to one or more physical conditions of the photonic device, including but not limited to a temperature condition of the photonic device.

For example, suitable embodiments of the present disclosure may use any of the photonic devices described in co-pending U.S. Patent Application No. 63/034,056, filed Jun. 3, 2020, the entire teachings of which are expressly incorporated herein by reference. This application describes a photonic device having one or more optical resonators with a first resonant frequency response relative to temperature and a different second resonant frequency response relative to temperature. In at least one embodiment using multiple optical resonators, a first waveguide optically couples input light (such as the second light beam from the optical splitter 304 herein) having a first frequency to the first optical resonator and a second waveguide optically couples input light having a second frequency (such as a frequency shifted second light beam from the optical splitter 304 herein) to the second optical resonator. Light output from the optical resonators is combined and a beat frequency in the combined light output is used to determine a temperature of the photonic device. One or more photodetectors (e.g., photodetector 312) converts the light output into an electric signal that is provided to a computing device (e.g., computing device 324), and a detected frequency represented by the electric signal indicates the beat frequency of the light output. As a form of resonant frequency (or signature frequency) of the photonic device 310, this beat frequency, in turn, is correlated with the temperature of the photonic device. In yet other embodiments, one or more multimode optical resonators may be used.

Optionally, a third light beam produced by the optical splitter 304 may be directed to an optical resonator 318 having known resonant characteristics. The optical resonator 318 produces an output having a plurality of reference peaks of intensity (which can include peaks or troughs) that occur as the frequency of the light in the light beam emitted by the light source 302 changes. For example, in some embodiments, the optical resonator 318 may be constructed using known technology such as a fiber optic Fabry-Pérot resonator. The optical resonator 318 can be any type of optical resonator having multiple resonance peaks between $\lambda_0$ and $\lambda_1$. Further, as temperature control of the reference cell 306 and optical resonator 318 may be important to assuring expected operation of the system 300, the reference cell 306 and optical resonator 318 may be contained in a temperature control box 330 with appropriate heating and/or cooling devices that maintain a constant temperature of the reference cell 306 and optical resonator 318.

Light in the third light beam that has traversed the optical resonator 318 is output to the photodetector 320. As the third light beam scans across a range of frequencies (i.e., due to control of the light source 302), the photodetector 320 detects optical intensity or power of the output light from the optical resonator 318 and provides a corresponding electric signal 404, such as illustrated in FIG. 4(b), to the computing device 324. Based on this signal 404, the computing device 324 identifies reference peaks 406 in the light that is output from the optical resonator 318. Peaks in the output optical intensity or power occur at the resonant frequencies of the optical resonator 318. The resonant frequencies at which the optical resonator 318 produces a peak output intensity or power, as detected by the photodetector 320 and observed by the computing device 324, are used in the measurement system 300 as reference peaks that ultimately facilitate the determination of a signature frequency (e.g., resonant frequency) of the photonic device 310, as described herein.

As illustrated in FIG. 4(b), the reference peaks 406, labeled as ranging from 0 to n, occur at regular frequency intervals that are multiples of a base resonant frequency $\lambda_{Res}$ of the optical resonator 318. The span of frequencies $\Delta\lambda_{Res}$ from one reference peak to the next reference peak (or "distance" between the reference peaks) is determined from the output of the optical resonator 318. In implementations of the measurement system 300 having a constant rate of change of frequency of the output light from the light source 302, the distance between any two reference peaks 406 is constant. The multiple reference peaks 406 thus provide a "ruler" with multiple "ticks" between the reference frequencies $\lambda_0$ and $\lambda_1$ (e.g., absorption lines) of the reference cell 306. This "ruler" can help improve the accuracy of determining the signature frequency of the photonic device 310, e.g., as illustrated by FIGS. 4(b) and 4(c) where the signature frequency of the photonic device 310 is a resonant frequency.

The optical intensity or power of the light that traversed the photonic device 310, as detected by the photodetector 312, is monitored by the computing device 324 to identify a resonant peak or peaks. Briefly stated, once a peak in the detected optical intensity or power is identified, the resonant frequency of the photonic device 310 (at which the peak occurred) can be determined by the computing device 324 using the reference frequency from the reference cell 306 and optionally the reference peaks 406 from the optical resonator 318 and/or elapsed time over which the light source 302 has output light across the range of frequencies. The elapsed time may be counted or monitored by a clock (not illustrated) that is internal or external to the computing device 324. In embodiments where the system 300 is used for temperature measurement, the determined resonant frequency of the photonic device 310 is thereafter usable to determine the temperature of the photonic device 310.

FIGS. 4(a) to 4(c) illustrate an example in which a signature frequency (e.g., a resonant frequency) of a photonic device 310 is determined in accordance with principles of the present disclosure. As mentioned earlier, a portion of the light that is output by the light source 302 is directed to the reference cell 306. At a time $t_0$, a reference frequency $\lambda_0$ is determined based on observed output from the reference cell 306 and, in this implementation, known absorption characteristics of the reference material in the reference cell 306. Another portion of the light output by the light source 302 may be directed to the optical resonator 318 which produces multiple reference peaks 406 as the output light from the light source 302 to scans across a range of frequencies from the reference frequency $\lambda_0$. The reference peaks in the output of the optical resonator 318 occur at frequency intervals as the frequency of the light in the light beam emitted by the light source 302 changes. At a time $t_d$, as indicated in FIG. 4(c), the photonic device 310 exhibits a peak intensity power output. This peak power (negative or positive from a baseline) occurs at the resonant (signature) frequency $\lambda_d$ of the photonic device 310.

The computing device 324 may determine the value of the resonant frequency $\lambda_d$ of the photonic device 310 based on the reference frequency $\lambda_0$ (determined from the reference cell 306) and either or both the reference peaks 406 from the optical resonator 318 and/or elapsed time from detection of the reference frequency $\lambda_0$ or from detection of a reference peak 406, such as the reference peak coinciding or immediately preceding detection of the peak power output from the photonic device 310 at time $t_d$.

In the embodiment illustrated in FIGS. 3 and 4, where an optical resonator 318 is included in the system 300, it is observed that the $i^{th}$ reference peak 406 occurred immediately preceding time $t_d$. The total number of reference peaks 406 from the 0$^{th}$ reference peak (which occurred concurrent to or immediately preceding time $t_0$ when the reference frequency $\lambda_0$ was detected) to the $i^{th}$ reference peak at time $t_i$ can be determined, and given the known frequency span $\Delta\lambda_{Res}$ between adjacent reference peaks 406, the frequency of the light at time $t_i$ can be quickly determined and used as an approximate value of the resonant frequency $\lambda_d$ of the photonic device 310. In some embodiments, this may involve determining a total number of reference peaks that occurred in the output of the optical resonator 318 from when the output of the reference cell 306 indicated a reference frequency (i.e., a first identifiable output occurred) to when the output of the photonic device 310 exhibited a resonant frequency (i.e., a second identifiable output occurred), determining a total change of frequency of the light in the light beam emitted by the light source 302 based on the known change of frequency between adjacent reference peaks 406 multiplied by the total number of reference peaks, and adding the total change of frequency to the reference frequency indicated by operation of the reference cell 306.

Alternatively, in embodiments where an optical resonator 318 is not used but the light output from the light source 302 increases (or decreases) in frequency at constant rate, the elapsed time from detection of the reference frequency $\lambda_0$ at time $t_0$ (using the reference cell 306) to the time $t_d$ at which the peak power (resonance) output from the photonic device 310 is detected may be used in connection with the constant rate of frequency change to calculate a value of the resonant frequency $\lambda_d$ of the photonic device 310 at the time $t_d$. In some embodiments, the light source 302 may be controlled so as to sweep (increase or decrease) the frequency of the light at a constant rate by carefully controlling the current ramp 328. In other words, the signature frequency of the photonic device 310 is determined by monitoring elapsed time or a current change (e.g., of the current ramp 328 that controls operation of the light source) from when the first identifiable output occurred (the reference cell 306 indicated a reference frequency) to when the second identifiable output occurred (the photonic device 310 exhibited a resonant frequency), determining a total change of frequency of the light in the light beam emitted by the light source 302 based on the controlled change of frequency and the elapsed time or current change, and adding the total change of frequency to the reference frequency indicated by the reference cell 306.

To obtain a more precise determination of the value of the resonant frequency $\lambda_d$, especially where the resonant frequency $\lambda_d$ occurs between reference peaks 406 as shown in FIGS. 4(b) and 4(c), the system 300 may consider the amount of time elapsed from the time $t_i$ to the time $t_d$ and using a known (or expected) rate of change of frequency of the light that is output from the light source 302 in that time period, a value for an incremental frequency $\delta\lambda$ can be determined. The incremental frequency $\delta\lambda$ is the amount of change of frequency in the light from the light source 302 occurring between time $t_i$ and time $t_d$. The value of the incremental frequency $\delta\lambda$ can then be added to the frequency $\lambda_i$ that was determined when the $i^{th}$ reference peak 406 occurred at time $t_i$, with the resulting sum representing the resonant (signature) frequency $\lambda_d$ of the photonic device 310.

In contrast to prior art systems that use expensive and complex wavelength meters to determine the resonant frequency of a photonic device, systems constructed according to the present disclosure are able to accurately determine the resonant frequency of a photonic device with low uncertainty using far simpler and less expensive components. The measurement system 300 described herein may provide improved resolution, at a lower cost, with improved robustness to variation in ambient temperature, and require less frequent or no recalibration. The measurement accuracy derives, at least in part, from the known, stable molecular absorption lines of the reference material in the reference cell. The measurement precision may be enhanced when using an optical resonator, such as a fiber optic Fabry-Pérot resonator, that provides an output at resonant frequencies which can act as a "ruler."

When the measurement system 300 is used in a photonic thermometer, the determined resonant frequency of the photonic device 310 is correlated to the temperature of the device 310, and therefore indicative of temperature, e.g., of the environment. For a given photonic device 310, the computing device 324 may be programmed with an equation or a look-up table that correlates the determined signature (e.g., resonant) frequency of the photonic device 310 to the temperature of the device 310. The photonic thermometer may thus determine a temperature without using an expensive and complex wavelength meter. As a result, the photonic thermometer may produce a temperature reading with improved accuracy and precision over a longer period of time, that is less expensive to manufacture and operate, and may involve less maintenance relative to prior art photonic thermometers.

Embodiments of the measurement system 300 may optionally include an interferometer or other temperature measurement device for determining a coarse (lower accuracy) temperature measurement, or estimated temperature, in combination with (and possibly on the same chip as) the photonic device 310. In such embodiments that include an interferometer, light output from the interferometer may be directed the photodetector 322 which provides a representative electrical signal to the computing device 324. The computing device 324 may use the output from the photodetector 322 to determine a rough temperature readout or temperature estimation. Having a rough temperature estimation can help the computing device 324 properly correlate a detected signature frequency of the photonic device 310 with the temperature of the photonic device 310 by providing a reference temperature or temperature range that guides an accurate correlation of signature frequency to the temperature of the photonic device. For instance, the photonic device may have multiple modes and having an estimated temperature helps determine the mode of the photonic device so that the signature frequency is accurately correlated to the temperature of the photonic device (which is at or within range of the estimated temperature).

Examples of measurement systems 300 that suitably implement an interferometer for improved determination of temperature are described in co-pending U.S. Patent Application No. 63/034,063, filed Jun. 3, 2020, the entire teachings of which are expressly incorporated herein by reference. As described in this co-pending application, the interferometer may include a beam splitter that is coupled to an optical signal generator, which in some cases may be the optical splitter 304 that is coupled to the light source 302 in FIG. 3. The interferometer includes a first arm that is coupled to the beam splitter to receive and optically transmit a first beam, and a second arm that is coupled to the beam splitter to receive and optically transmit a second beam. The second arm introduces a phase shift in the second beam relative to the first beam.

The interferometer further includes a beam combiner coupled to the first arm and the second arm. The beam combiner receives the first beam and the phase-shifted second beam and combines at least a portion of the first beam and the phase-shifted second beam to produce an output optical signal.

An optical signal detector, such as the photodetector 322, is coupled to the beam combiner and measures an optical signal intensity or power of the output from the interferometer. The computing device 324 receives an electric signal representative of the measured optical signal intensity or power. In embodiments where the system 300 is implemented in a photonic thermometer, the computing device 324 correlates the detected optical signal intensity or power from the interferometer with a temperature to produce an estimated temperature measurement.

In various embodiments, the interferometer may include a first waveguide that forms the first arm and a second waveguide that forms the second arm. The second arm introduces a phase shift in the light beam that it carries relative to the light beam that is carried by the first arm. In some embodiments, the second waveguide provides an optical transmission path for the second beam that is longer than an optical transmission path provided by the first waveguide for the first beam. In some embodiments, a difference in the material used to construct the first arm and the second arm may produce the relative phase shift in the light beams carried by first and second arms. In yet other embodiments, a difference in stress, strain, or doping of the second arm as compared to the first arm may introduce the relative phase shift.

In various embodiments, the computing device 324 correlates the measured optical signal intensity or power from the interferometer with the temperature according to a characteristic curve that relates the output optical signal intensity or power to the temperature. The characteristic curve may be generated by calibration of the measurement system 300 using transmission of an input optical signal through the system 300, including the interferometer, at known temperatures and recording corresponding measurements of the optical signal intensities or power at the known temperatures.

In some embodiments, the interferometer may be configured as a Mach-Zehnder interferometer, while in other embodiments the interferometer may be configured as a Michelson interferometer. In some embodiments, the measurement system 300 may include two or more interferometers with the photonic device 310. In such embodiments, the first interferometer produces an output optical signal at a measured first optical signal intensity, while the second interferometer produces an output optical signal at a measured second optical signal intensity. The second interferometer may include a first arm that receives and optically transmits a portion of the input optical signal as a first beam, and a second arm that receives and optically transmits a portion of the input optical signal as a second beam. As with the first interferometer, the second arm of the second interferometer may introduce a phase shift in the second beam relative to the first beam. The transmitted first beam and phase-shifted second beam combine to produce an output optical signal. An optical signal detector measures the optical signal intensity or power of the output signal of the second interferometer. The computing device 324 receives the measured first optical output of the first interferometer and the measured second optical output of the second interferometer, and correlates both the first and second optical outputs with a temperature to produce the measured temperature.

The first and second interferometers may each have a respective characteristic curve that relates the measured first and second optical signal intensities to the temperature. In such case, the processor correlates both the first optical output of the first interferometer and the second optical output of the second interferometer with the temperature according to the respective characteristic curves. At any particular temperature, the characteristic curve of the first interferometer may have a slope reflecting a temperature sensitivity (i.e., change of output signal intensity per change in temperature) that is different than the temperature sensitivity of the second interferometer. The characteristic curve of the second interferometer may be shifted in phase relative to the characteristic curve of the first interferometer, such that, for any specific temperature, the optical signal transmitted through the first and second interferometers produces respective output optical signals having different measured optical signal intensities or power.

Additionally, in various embodiments, the measurement system 300 may further comprise a reference arm through which at least a portion of the input optical signal (light beam) from the light source 302 is transmitted to produce an output optical signal. An optical signal detector (photodetector) coupled to the reference arm may receive the output from the reference arm and measure an optical signal intensity or power thereof. The measured optical signal intensity or power of the light from the interferometer may be normalized by the measured optical signal intensity or power of the reference arm.

In other embodiments, a rough or coarse (lower accuracy) temperature measurement, or estimated temperature, may be obtained by other types of temperature measurement devices, including but not limited to a resistance thermometer (thermistor) or a thermocouple. Again, these other types of temperature measurement devices may be constructed on chip with the photonic device 310, or be constructed off chip from the photonic device 310. As with an interferometer, such different types of temperature measurement devices are used for rough temperature estimation that helps the computing device 324 properly correlate a detected signature (e.g., resonant) frequency of the photonic device 310 with the temperature of the photonic device 310. Therefore, while an embodiment of the measurement system 300 is illustrated in FIG. 3 as including an interferometer and photodetector 322, other embodiments of the system 300 may suitably include a different device that can roughly estimate temperature.

Figure 5:
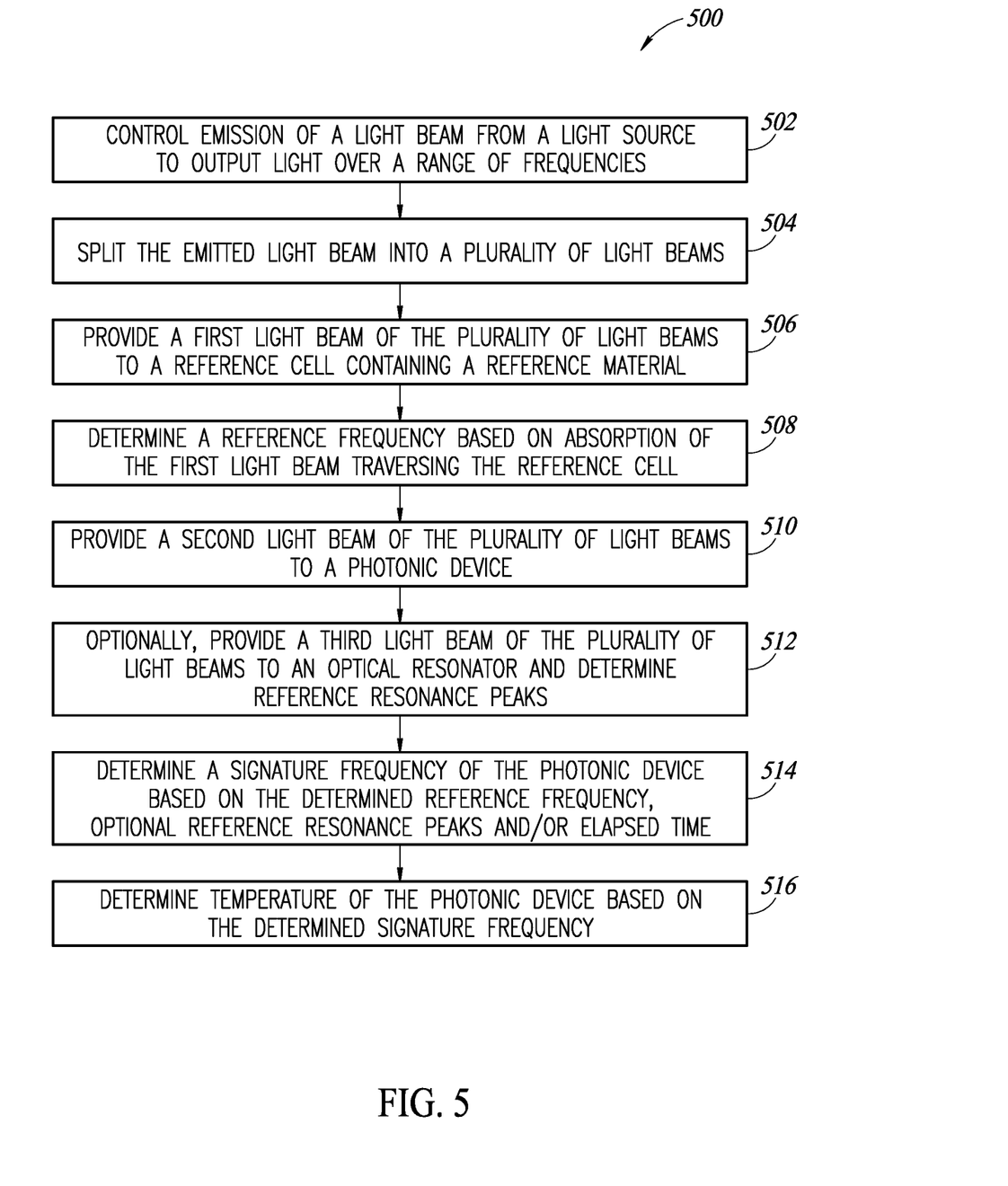
FIG. 5 is a flow diagram illustrating one example of a method for measuring temperature in accordance with the present disclosure.

FIG. 5 is a flow diagram illustrating a method 500 for determining a signature frequency (e.g. resonant frequency) of a photonic device in accordance with aspects of the present disclosure. The method 500 includes controlling emission of a light beam from a light source so as to output light over a range of frequencies, as indicated at block 502, and splitting the emitted light beam into a plurality of light beams, as indicated at block 504. At block 506, a first light beam of the plurality of light beams is provided to a reference cell containing a reference material. As the light beam emitted by the light source progresses over the range of frequencies, a reference frequency is determined based on absorption of the first light beam traversing the reference cell, as indicated at block 508. As mentioned earlier, instead of determining a reference frequency based on absorption of the first light beam, the reference frequency may be determined based a resonance of the first light beam.

As indicated at block 510, the method 500 includes providing a second light beam of the plurality of light beams to a photonic device. As the light beam emitted by the light source changes frequency and progresses over the range of frequencies, a signature (resonant) frequency of the photonic device may be observed.

Optionally, as indicated at block 512, a third light beam of the plurality of light beams is provided to an optical resonator. As the light in the light beam emitted by the light source changes frequency and progresses over the range of frequencies, intensity peaks in the output of the optical resonator, and their corresponding reference frequencies, may be determined.

As indicated at block 514, the signature frequency of the photonic device (e.g., a resonant frequency of the photonic device) may be determined using the reference frequency determined at block 508, with optional consideration of the reference peaks determined at block 512, a rough temperature estimation using an interferometer or other temperature measurement device, and/or elapsed time or current change, as described herein. Once the signature (resonant) frequency of the photonic device is determined, the temperature of the photonic device may be determined based on the signature frequency, as indicated at block 516 and described herein.

It should be appreciated that the various embodiments described above can be combined to provide further embodiments. Furthermore, all of the patents, applications, and publications referred to in this specification and/or listed in the Application Data Sheet are incorporated herein by reference, in their entirety. Aspects of the embodiments can be modified, if necessary to employ concepts of the various patents, applications, and publications to provide yet further embodiments. These and other changes can be made to the embodiments in view of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system for determining a signature frequency of a photonic device, comprising:
a reference cell configured to receive a first light beam of a plurality of light beams, wherein based on a predetermined characteristic of the reference cell, the reference cell produces a first identifiable output indicative of a known reference frequency in response to light in the first light beam having a particular frequency;
the photonic device being configured to receive a second light beam of the plurality of light beams, wherein the photonic device produces a second identifiable output in response to light in the second light beam having a frequency at the signature frequency of the photonic device; and
a computing device configured to receive electrical signals representative of the first and second identifiable outputs of the reference cell and the photonic device, respectively, and to use the electrical signals to determine the signature frequency of the photonic device, wherein the signature frequency of the photonic device is determined at least in part based on the known reference frequency indicated by the first identifiable output.

2. The system as claimed in claim 1, further comprising:
a light source configured to emit a light beam having a controllable frequency of light; and
an optical splitter configured to split the light beam emitted by the light source into the plurality of light beams,
wherein the signature frequency of the photonic device is a resonant frequency of the photonic device.

3. The system as claimed in claim 2, wherein the light source is a tunable laser, the system further comprising a current ramp coupled to the tunable laser that controls the frequency of the light in the light beam.

4. The system as claimed in claim 2, further comprising an optical resonator configured to receive a third light beam of the plurality of light beams, wherein the optical resonator produces an output having a plurality of reference peaks of intensity that occur as the frequency of the light in the light beam emitted by the light source changes.

5. The system as claimed in claim 4, wherein the plurality of reference peaks of intensity in the output of the optical resonator occurs at frequency intervals, and the computing device receives an electrical signal representative of the plurality of reference peaks of intensity in the output of the optical resonator.

6. The system as claimed in claim 5, wherein the computing device is configured to use the electrical signal representative of the plurality of reference peaks of intensity along with the electrical signals representative of the first and second identifiable outputs to determine the signature frequency of the photonic device.

7. The system as claimed in claim 6, wherein the computing device determines the signature frequency of the photonic device by determining a total number of reference peaks that occurred in the output of the optical resonator from when the first identifiable output occurred to when the second identifiable output occurred, determining a total change of frequency of the light in the light beam emitted by the light source based on a known change of frequency between adjacent reference peaks multiplied by the total number of reference peaks, and adding the total change of frequency to the known reference frequency indicated by the first identifiable output.

8. The system as claimed in claim 2, wherein the computing device determines the signature frequency of the photonic device by monitoring elapsed time or a current change from when the first identifiable output occurred to when the second identifiable output occurred, determining a total change of frequency of the light in the light beam emitted by the light source based on the controlled change of frequency and the elapsed time or current change, and adding the total change of frequency to the known reference frequency indicated by the first identifiable output.

9. The system as claimed in claim 1, further comprising a first photodetector coupled to receive a first light output from the reference cell and a second photodetector to receive a second light output from the photonic device, wherein the first and second photodetectors are configured to produce the electrical signals representative of the first and second identifiable outputs based on the first light output from the reference cell and the second light output from the photonic device.

10. The system as claimed in claim 1, wherein the predetermined characteristic of the reference cell is a known absorption characteristic of reference material in the reference cell, and wherein the reference cell produces the first identifiable output in response to light energy in the first light beam at the particular frequency being absorbed by the reference material.

11. The system as claimed in claim 1, wherein the predetermined characteristic of the reference cell is a known optical resonance of the reference cell, and wherein the reference cell produces the first identifiable output in response to the first light beam at the particular frequency resonating in the reference cell.

12. A method for determining a signature frequency of a photonic device, comprising:
receiving, by a reference cell, a first light beam of a plurality of light beams, and based on a predetermined characteristic of the reference cell, producing a first identifiable output indicative of a known reference frequency when the first light beam has a particular frequency;

receiving, by a photonic device, a second light beam of the plurality of light beams, and producing a second identifiable output when the second light beam has a frequency at the signature frequency of the photonic device; and receiving, by a computing device, electrical signals representative of the first and second identifiable outputs of the reference cell and the photonic device, respectively, and using the received electrical signals to determine the signature frequency of the photonic device, wherein the signature frequency of the photonic device is determined at least in part based on the known reference frequency indicated by the first identifiable output.

13. The method as claimed in claim 12, further comprising:

causing a light source to emit a light beam having a controllable frequency of light; and splitting the light beam emitted by the light source into the plurality of light beams, wherein the signature frequency of the photonic device is a resonant frequency of the photonic device.

14. The method as claimed in claim 13, further comprising:

receiving, by an optical resonator, a third light beam of the plurality of light beams, and producing an output having a plurality of reference peaks of intensity occurring at frequency intervals as the frequency of the light in the light beam emitted by the light source changes, and receiving, by the computing device, an electrical signal representative of the plurality of reference peaks of intensity in the output of the optical resonator, and using the electrical signal representative of the plurality of reference peaks of intensity along with the electrical signals representative of the first and second identifiable outputs to determine the signature frequency of the photonic device.

15. The method as claimed in claim 14, wherein the signature frequency of the photonic device is determined by determining a total number of reference peaks that occurred in the output of the optical resonator from when the first identifiable output occurred to when the second identifiable output occurred, determining a total change of frequency of the light in the light beam emitted by the light source based on a known change of frequency between adjacent reference peaks multiplied by the total number of reference peaks, and adding the total change of frequency to the known reference frequency indicated by the first identifiable output.

16. The method as claimed in claim 13, wherein the signature frequency of the photonic device is determined by monitoring elapsed time or a current change from when the first identifiable output occurred to when the second identifiable output occurred, determining a total change of frequency of the light in the light beam emitted by the light source based on the controlled change of frequency and the elapsed time or current change, and adding the total change of frequency to the known reference frequency indicated by the first identifiable output.

17. The method as claimed in claim 12, wherein the first identifiable output is produced in response to light energy in the first light beam at the particular frequency being absorbed by reference material in the reference cell.

18. The method as claimed in claim 12, wherein the first identifiable output is produced in response to the first light beam at the particular frequency resonating in the reference cell.

19. The method as claimed in claim 12, further comprising determining a temperature of the photonic device based on a correlation between the signature frequency of the photonic device and the temperature of the photonic device.

20. The method as claimed in claim 19, further comprising determining an estimated temperature of the photonic device, and using the estimated temperature to facilitate the determination of temperature of the photonic device based on the correlation between the signature frequency and the temperature of the photonic device.

* * * * *